G. E. SPRAGUE.
CULTIVATOR.
APPLICATION FILED NOV. 4, 1909.
966,260.
Patented Aug. 2, 1910.
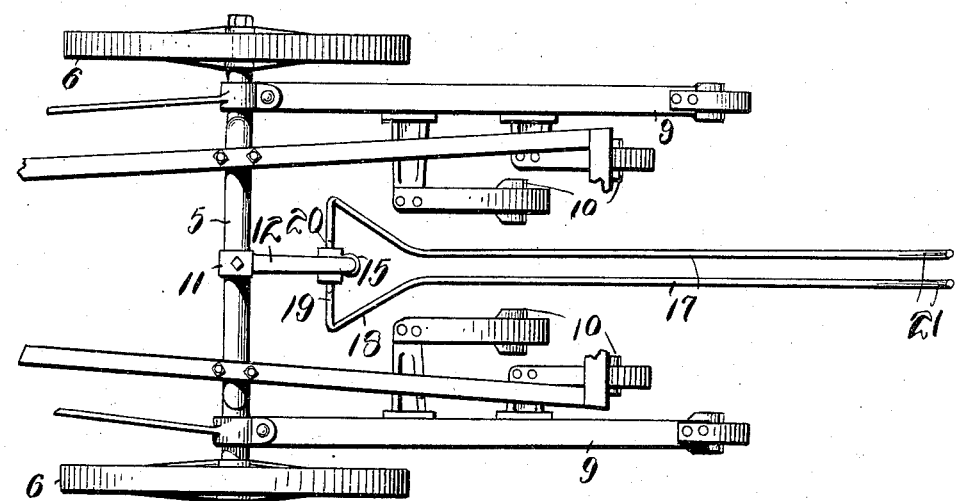
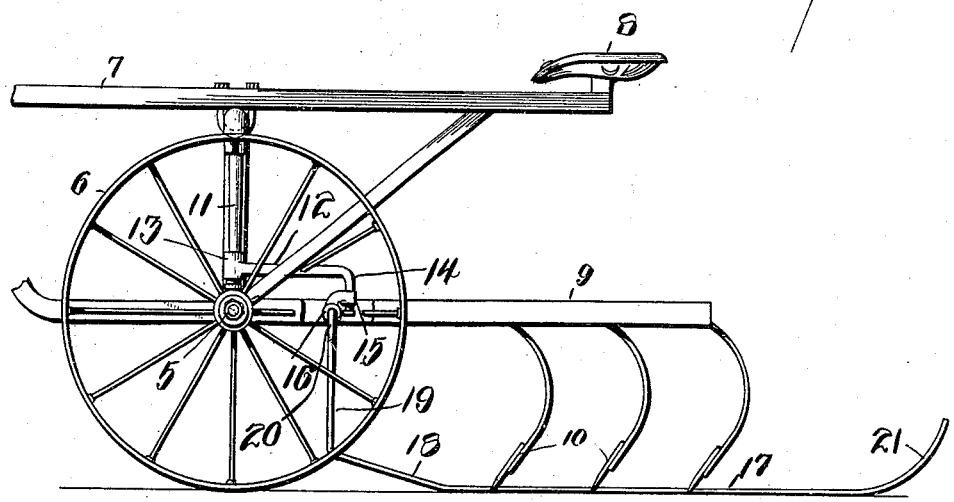
Witnesses
Inventor
George Edwin Sprague,
By
Attorneys

UNITED STATES PATENT OFFICE.

GEORGE E. SPRAGUE, OF CHAMPAIGN, ILLINOIS.

CULTIVATOR.

966,260.  Specification of Letters Patent.  Patented Aug. 2, 1910.

Application filed November 4, 1909. Serial No. 526,303.

*To all whom it may concern:*

Be it known that I, GEORGE E. SPRAGUE, a citizen of the United States, residing at Champaign, in the county of Champaign, State of Illinois, have invented certain new and useful Improvements in Cultivators; and I do hereby declare the following to be a full, clear, and exact description of the invention, such as will enable others skilled in the art to which it appertains to make and use the same.

The invention relates to a cultivator attachment and more particularly to the class of attachment for riding cultivators.

The primary object of the invention is the provision of a cultivator attachment in which falling plants may be brought to upright position during the cultivation of the soil between the rows of plants.

A further object of the invention is the provision of an attachment of this character in which the loose soil from the cultivator will be caused to fill in around the plants of a row during the advancement of the machine through a field of growing plants.

A still further object of the invention is the provision of an attachment which is simple in construction, thoroughly reliable and efficient in operation, and inexpensive in the manufacture.

With these and other objects in view, the invention consists in the construction, combination and arrangement of parts, as will be hereinafter more fully described, illustrated in the accompanying drawings, which disclose the preferred form of embodiment of the invention, to enable those skilled in the art to carry the same into practice, and as pointed out in the claim hereunto appended.

In the drawings:—Figure 1 is a top plan view of a cultivator with the attachment applied thereto. Fig. 2 is a side elevation thereof.

Similar reference characters indicate corresponding parts throughout the several views in the drawings.

Referring to the drawings by numerals, 5 designates an axle of any suitable construction of the cultivator frame although preferably it is of arch shape at its center as usual and provided with supporting wheels 6, and suitable draft attachments such as poles 7, which are connected to the arch of the axle and these poles support the usual riding seat 8 to be occupied by the operator. It is to be understood however, that the invention as herein set forth is not limited to employment with any particular kind of frame but is generally adaptable.

Suitably connected with the terminals of the axle 5, carrying the supporting wheel 6, are pivotal cultivator beams 9, the same extending horizontally and rearwardly from the end portions of said axle and so connected therewith preferably as to permit independent vertical and lateral swing of each beam. These beams 9 support in the usual manner cultivator shares or blades 10, so as to straddle the row of standing plants in a field to operate upon the soil at opposite sides thereof so that they will always leave the surface of the soil in proper condition.

Depending centrally from the arch of the axle 5, is a stem 11, to which latter is loosely connected an arm 12, the same being formed at one end with a sleeve 13, surrounding the stem, while the opposite end of this arm is formed with a right angular depending stud 14, the latter being loosely surrounded by a casting forming a collar 15, and a vertical ear 16, the same containing a suitable opening for receiving and the attachment to the ear of a plant straddling frame, which will be hereinafter more fully described. This straddling frame comprises spaced parallel runners 17, the forward extremities of which are formed with outwardly diverging portions 18, the same being integral with a vertical inverted U-shaped yoke 19, having a central offset portion 20, engaged in the opening of the ear 16, of the casting, and these runners 17, extend rearwardly of the frame and are disposed horizontally at opposite sides of a row of stalks or standing plants. The free ends of the runners are provided with upwardly curved terminals 21, which latter are adapted to engage a falling plant to raise the same and bring it to erect position as the cultivator is being advanced through a field for cultivating the soil at opposite sides of the standing row of plants.

What is claimed is:—

The combination with a cultivator, of a frame loosely connected centrally to the cultivator and extending rearwardly thereof, the said frame comprising spaced parallel runners having upwardly curved terminals at its free ends and an inverted U-shaped yoke integral with the opposite ends thereof.

In testimony whereof, I affix my signature, in presence of two witnesses.

GEORGE E. SPRAGUE.

Witnesses:
 FRANK T. BEAVER,
 JAMES N. ARMSTRONG.